(12) United States Patent
Baldwin et al.

(10) Patent No.: US 10,554,030 B1
(45) Date of Patent: Feb. 4, 2020

(54) ELECTRICAL BOX BRACE

(71) Applicants: Jeffrey Baldwin, Anthem, AZ (US); John Klein, Gilbert, AZ (US); Ryan Liebengood, Gilbert, AZ (US)

(72) Inventors: Jeffrey Baldwin, Anthem, AZ (US); John Klein, Gilbert, AZ (US); Ryan Liebengood, Gilbert, AZ (US)

( * ) Notice: Subject to any disclaimer, the term of this patent is extended or adjusted under 35 U.S.C. 154(b) by 0 days.

(21) Appl. No.: 16/016,565

(22) Filed: Jun. 23, 2018

Related U.S. Application Data

(63) Continuation of application No. 14/641,355, filed on Mar. 7, 2015, now Pat. No. 10,008,842.

(60) Provisional application No. 61/951,534, filed on Mar. 12, 2014.

(51) Int. Cl.
*H02G 3/12* (2006.01)
*F16M 13/02* (2006.01)

(52) U.S. Cl.
CPC ............ *H02G 3/125* (2013.01); *F16M 13/02* (2013.01); *F16M 13/027* (2013.01); *H02G 3/12* (2013.01)

(58) Field of Classification Search
CPC ...... F16M 13/02; F16M 13/027; F16M 13/00; H02G 3/125; A62C 35/68; B60R 2011/0084; E04B 9/006; E04B 9/18; E04G 21/243; F16B 2/02
USPC ......... 248/546, 201, 216.1, 214, 200.1, 343, 248/344, 906, 227.3, 227.4, 230.5, 248/231.61; 174/50, 40 R, 491, 61
See application file for complete search history.

(56) References Cited

U.S. PATENT DOCUMENTS

| | | | |
|---|---|---|---|
| 2,713,983 A | 7/1955 | Kay | |
| 4,659,051 A | 4/1987 | Propp | |
| 4,682,452 A | 7/1987 | Propp | |
| 4,974,888 A * | 12/1990 | Childers | ............ F16B 37/0857 |
| | | | 292/251 |
| 5,150,868 A | 9/1992 | Kaden | |
| 5,720,461 A | 2/1998 | Kerr, Jr. | |
| 6,595,479 B2 | 7/2003 | Johnson | |
| 7,429,025 B1 | 9/2008 | Gretz | |
| 7,631,849 B2 | 12/2009 | Chen | |
| 8,132,767 B2 * | 3/2012 | Oh | ........................ F16B 2/065 |
| | | | 248/214 |
| 9,568,123 B2 * | 2/2017 | Zhang | .................... H02G 3/081 |
| 9,746,019 B2 * | 8/2017 | Oh | ...................... F16B 37/0857 |
| 10,008,842 B1 * | 6/2018 | Baldwin | ................ H02G 3/125 |
| 2011/0162468 A1 | 7/2011 | Lin | |
| 2012/0132762 A1 * | 5/2012 | Casenhiser | ............ H02G 7/053 |
| | | | 248/74.4 |
| 2015/0226375 A1 * | 8/2015 | Zhang | .................... H02G 3/081 |
| | | | 248/73 |

\* cited by examiner

*Primary Examiner* — Nkeisha Smith
(74) *Attorney, Agent, or Firm* — Booth Udall Fuller, PLC

(57) ABSTRACT

An electrical box brace including a rod, a sleeve, at least one mounting plate, an adjustment mechanism having a body, a spring and connecting the rod and sleeve, and at least one engagement device positioned within the adjustment mechanism body, wherein the at least one engagement device includes at least one threaded portion opposite a ramp, and wherein the ramp selectively engages the adjustment mechanism body to permit engagement or disengagement of the at least one threaded portion with the rod.

13 Claims, 13 Drawing Sheets

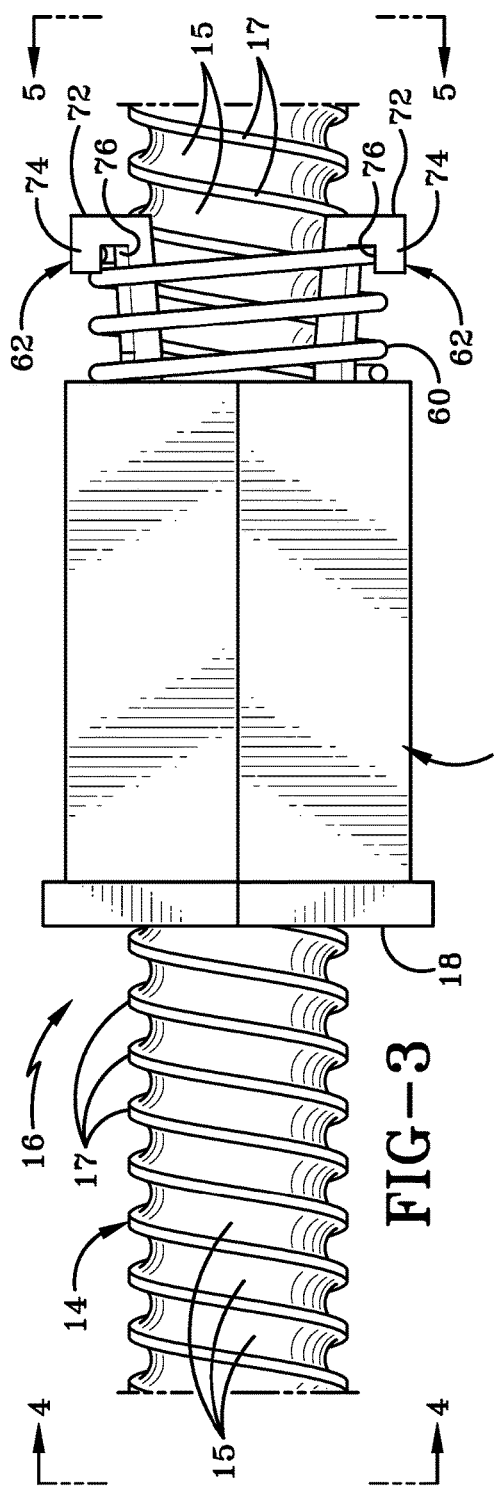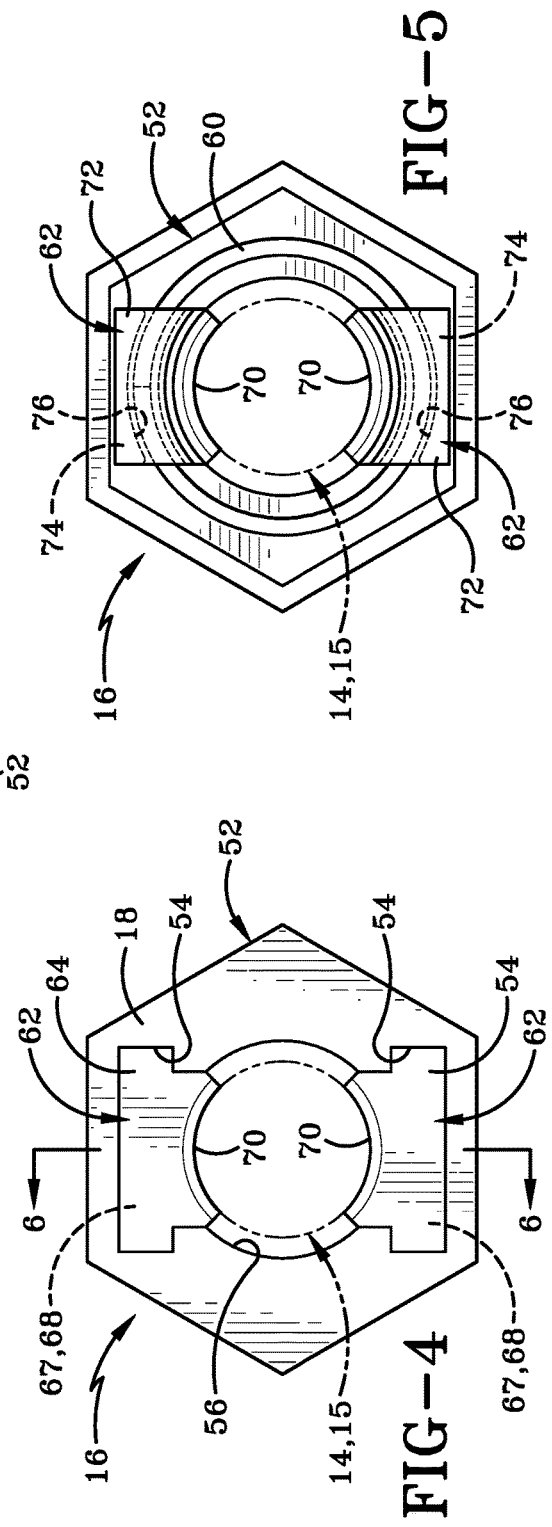

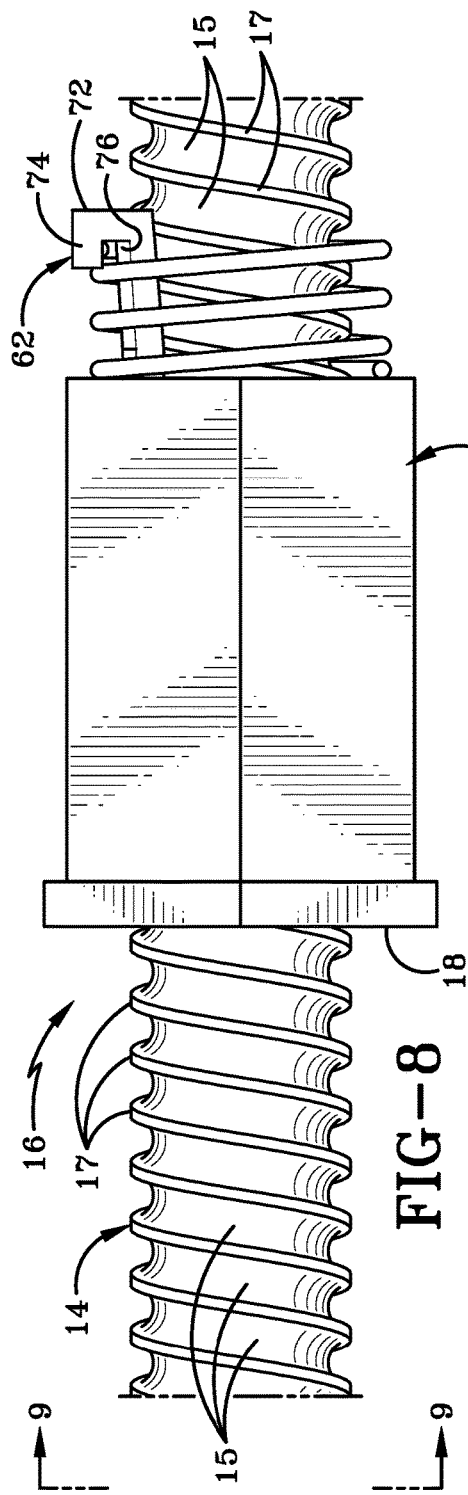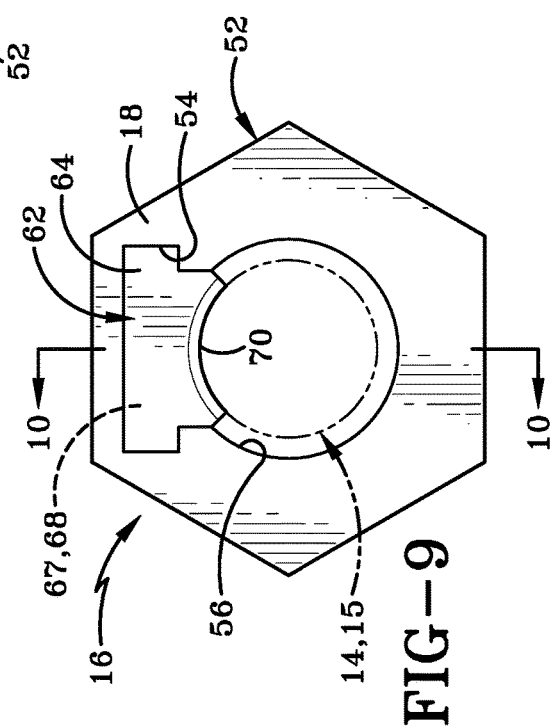

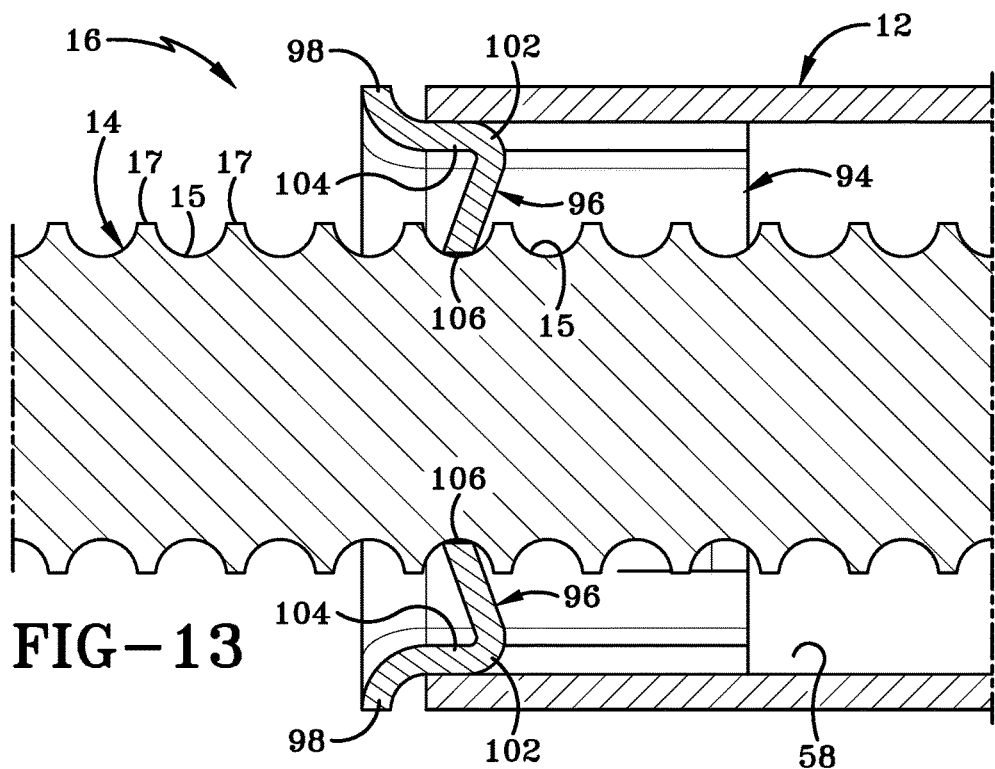
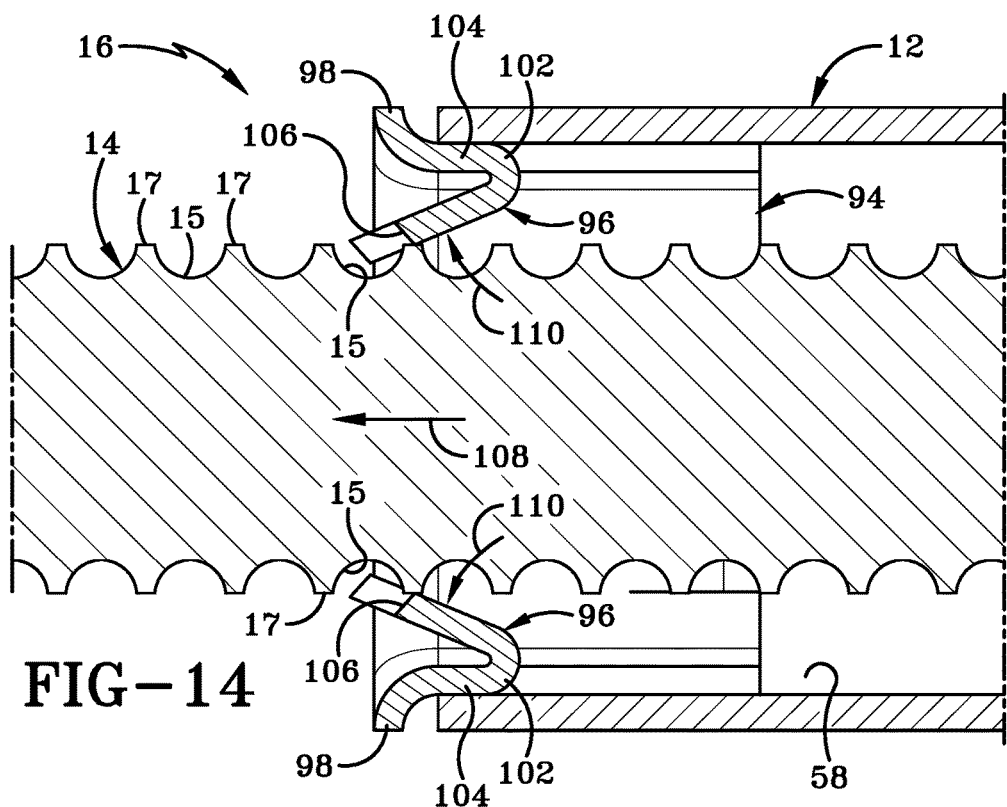

ELECTRICAL BOX BRACE

CROSS-REFERENCE TO RELATED APPLICATIONS

This application claims priority to currently pending U.S. patent application Ser. No. 14/641,355, filed on Mar. 7, 2015 and titled ELECTRICAL BOX BRACE to Baldwin et al., which will issue as U.S. Pat. No. 10,008,842 on Jun. 26, 2018, the disclosure of which is hereby incorporated herein by reference. This application claims priority to currently Provisional U.S. Patent Application No. 61/951,534, filed on Mar. 12, 2014 and titled CEILING FAN BOX BRACE to Baldwin et al., the disclosure of which is hereby incorporated herein by reference.

BACKGROUND

Electrical boxes are well known and have been used for decades in buildings. Electrical boxes are used both in walls and ceilings to provide electrical current to various places within a building. Further, the electrical boxes may also be used to mount various electrical receptacles, such as duplex or decorator outlets, or electrical switches. In ceilings, electrical boxes function to support the weight of the light fixture or ceiling fan in addition to providing electrical current to operate the light and/or fan.

Electrical boxes can be installed in a number of different ways. In new construction, the electrical boxes are mounted directly to studs or trusses and then drywall is mounted. In retrofit applications, the electrical box is mounted to drywall instead of the studs. In ceiling fan box retrofit installations the ceiling fan box must be mounted to the studs or other suitable structure so that the ceiling fan weight may be properly supported during fan operation.

SUMMARY

Aspects of this disclosure relate to electrical box braces. In one aspect, an electrical box brace includes a rod, a sleeve, at least one mounting plate, an adjustment mechanism connecting the rod and the sleeve, and wherein the adjustment mechanism permits at least two rates of relative movement between the rod and the sleeve.

In an implementation, the adjustment mechanism may be a threaded insert. The threaded insert may be spring biased in a closed position. The relative movement between the rod and the sleeve may be slower when the threaded insert is biased in the closed position. The relative movement between the rod and the sleeve may be faster when the threaded insert is in the open position. The threaded insert may include at least two threads. The threaded insert may further include an angled surface. The adjustment mechanism may further include an angled surface, wherein engagement between the angled surfaces compresses the threaded insert.

The threaded insert may include at least two inserts, one insert including a threaded portion and the other insert does not include a threaded portion. The first rate of relative movement may be in the axial direction and the second rate of relative movement may be rotational movement. The rotational movement may be slower than the axial movement. The adjustment mechanism may include a spring steel clamping mechanism. An electrical box may be permanently or removably secured to the brace. The electrical box may be a ceiling fan box. The axial movement may be permitted in a first direction and not permitted in a second direction opposite the first direction.

In another aspect, an electrical box brace includes a rod having threaded portions, a sleeve to receive the rod, an adjustment mechanism positioned in the sleeve, a mounting plate on an end of the sleeve, a mounting plate on the end of the rod, and wherein the adjustment mechanism selectively permits rotational or axial movement between the rod and the sleeve.

In another aspect, a method of mounting an electrical box includes the steps of positioning the electrical box brace between joists, pulling a sleeve and a rod in opposite directions until a mounting plate on each of the sleeve and the rod contacts each joist, and rotating the sleeve or rod to further displace the mounting plates.

In an implementation, the method may include the step of moving an adjustment mechanism to an open position during the pulling step. The method may include the step of moving the adjustment mechanism to a closed position before the rotating step.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and:

FIG. 3 is a side view of the adjustment mechanism.

FIG. 4 is a front view of the adjustment mechanism.

FIG. 5 is a rear view of the adjustment mechanism.

FIG. 8 is a side view of a second adjustment mechanism.

FIG. 9 is a front view of the second adjustment mechanism.

FIG. 13 is a sectional view of the fourth adjustment mechanism in a first position and taken generally about line 13-13 in FIG. 12.

FIG. 14 is a sectional view of the fourth adjustment mechanism in a second position and taken generally about line 13-13 in FIG. 12.

DETAILED DESCRIPTION

Figure 1:
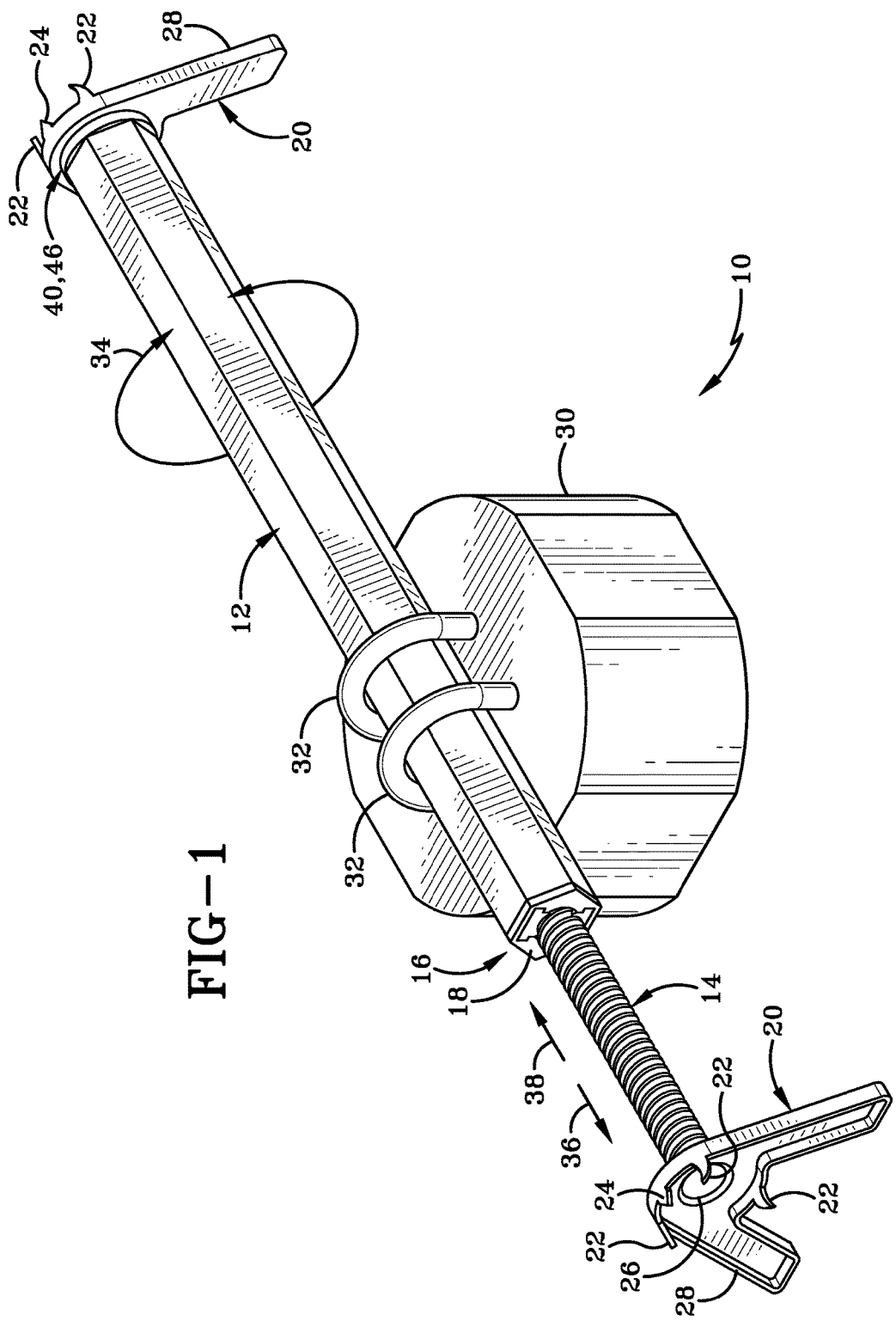
FIG. 1 is a perspective view of an electrical box brace.

This disclosure, its aspects and implementations, are not limited to the specific components or assembly procedures disclosed herein. Many additional components and assembly procedures known in the art consistent with the intended operation and assembly procedures for an electrical box brace will become apparent for use with implementations of an electrical box brace from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of an electrical box brace.

FIGS. 1-7 illustrate various views of a first aspect electrical box brace 10 having a sleeve 12 and a rod 14. Rod 14 may be threaded with any suitable thread dimensions or pitches, as well as multiple thread pitches on a single rod. An adjustment mechanism 16 includes a face 18 and may be positioned in sleeve 12 for engagement with rod 14. Mounting plates 20 are positioned on each of sleeve 12 and rod 14. Each mounting plate may include at least one curved engagement tooth 22 and/or at least one straight tooth 24 which each engage or grip a joist or other appropriate mounting structure. Further, each mounting plate 20 may include a mounting aperture 26 arranged to be secured to the rod 14 or sleeve 12 via threaded engagement, screws, nuts, rivets, or any other suitable mechanism such that a mounting face 28 of the mounting plate contacts the joist or other mounting structure upon installation.

A ceiling fan box or electrical box 30 may be secured to the sleeve 12 or rod 14 with clamps 32 or other known and suitable connecting devices including rivets, screws, or the like. In operation, electrical box brace 10 provides at least two different rates of relative movement between the rod and the sleeve as will be described in more detail below. In a first rate of relative movement, the rod and sleeve are moved in the direction associated with arrow 36 to quickly expand the distance between the mounting plates by pulling the mounting plates 20 apart from each other. In a second rate of relative movement, rotating the sleeve 12 or rod 14 in the direction associated with arrows 34 increases or decreases the distance between the mounting plates but at a rate slower than the first rate of relative movement. Still further, movement in the direction associated with arrow 38 is generally only accomplished as a resultant of rotation in the direction associated with arrows 34 as axial movement of the mounting plates towards one another is resisted by the adjustment mechanism, but axial movement of the mounting plates away from one another is generally permitted.

Figure 2A:
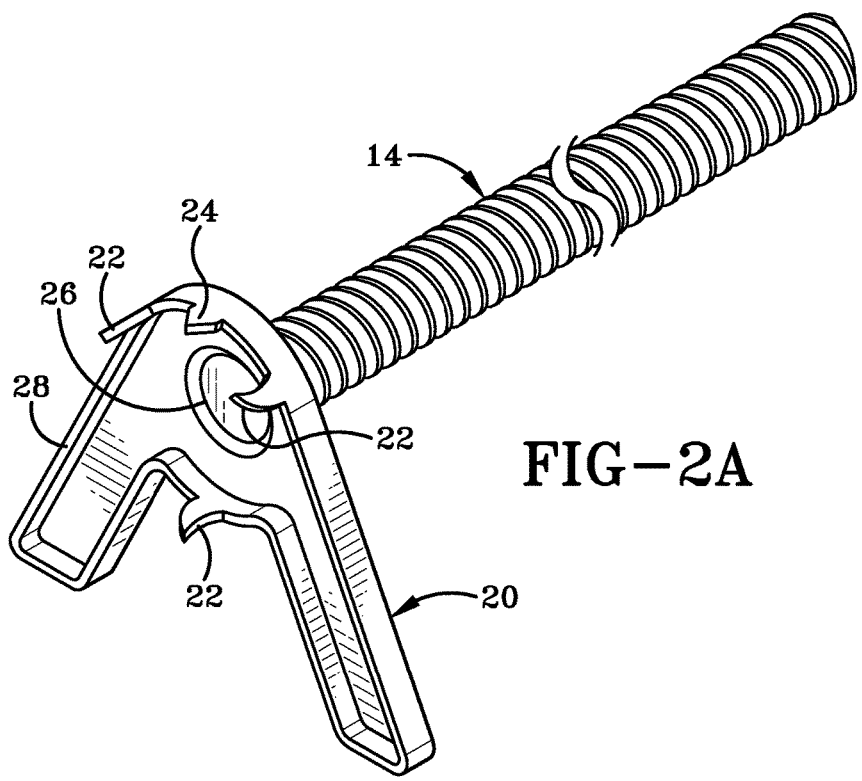
FIG. 2A is an enlarged view of the electrical box brace mounting end and thread.
Figure 2B:
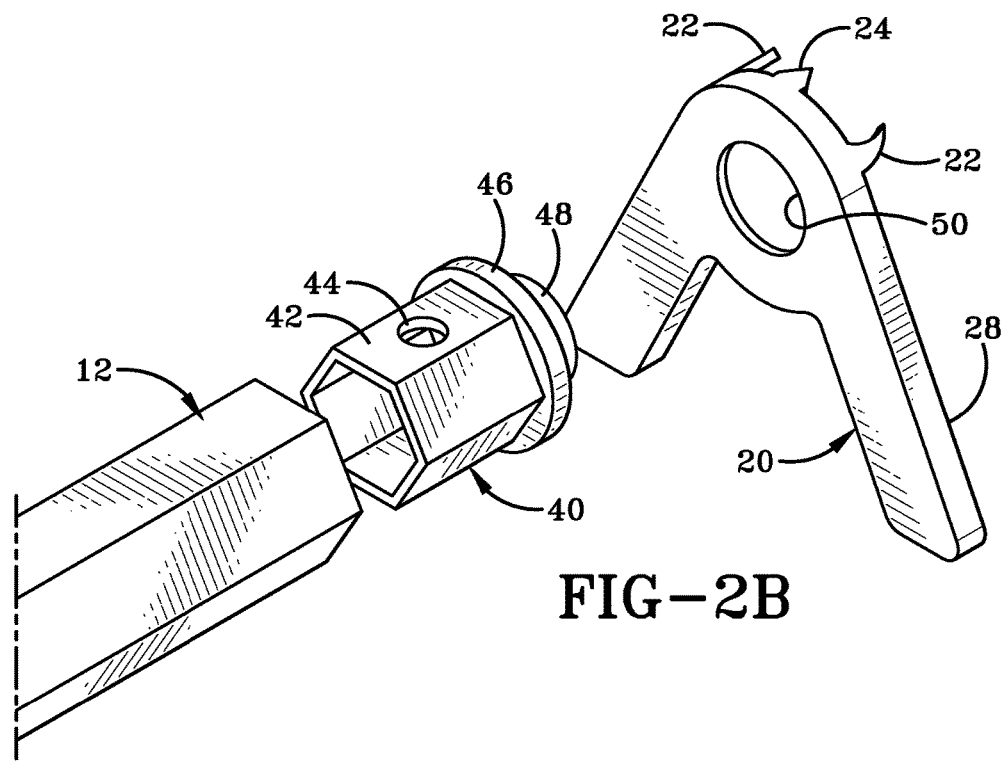
FIG. 2B is an enlarged view of the electrical box brace mounting end.

Moving to FIGS. 2A and 2B, sleeve 12 may include an end cap 40 having an end cap tongue 42 with an aperture 44 for securing the end cap in the sleeve 12. A stop 46 and a head 48 work in conjunction with apertures 26 in mounting plates 20. In this structure, stop 46 can rotate freely against the back of mounting plate 20 and head 48 may be compressed or riveted within aperture 26 such that the mounting plate 20 can be secured to the sleeve 12 and rod 14 to mount the electrical box brace between joists or other suitable mounting structures but still rotate about the rod or the sleeve if desired.

Figure 2C:
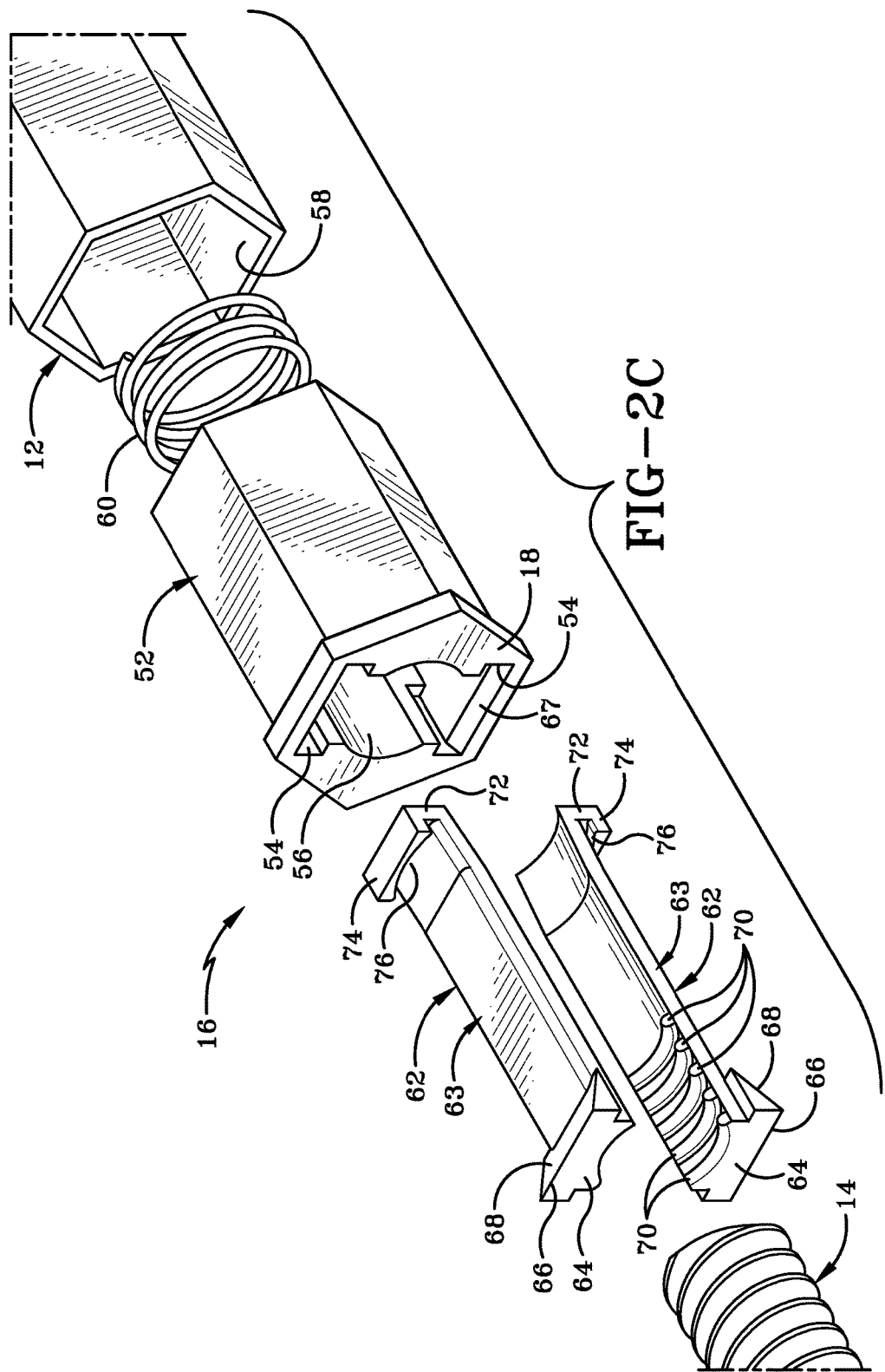
FIG. 2C is an exploded view of an adjustment mechanism.

FIG. 2C is an exploded view of a first adjustment mechanism 16. Body 52 includes face 18, an upper and lower engagement member slot 54, and a rod opening 56 passing through the entire body 52. Moving briefly to sleeve 12, an opening 58 therein is arranged to receive a spring 60 and to secure body 52 within the opening 58. The opening 58 may include an appropriate attachment mechanism to secure the adjustment mechanism 16 within the sleeve 12 at opening 58.

An engagement device 62 includes a body 63 having a first end 64 with a terminating portion 66 and a ramped portion 68. Further, a threaded portion 70 may be positioned near or overlapping ramped portion 68. A second end 72 may include a wall with a closing wall 74 forming a retaining region 76 there between which may be used to secure spring 60 therein.

As seen in FIG. 3, spring 60 is engaged between body 52 and retaining region 76. In this manner, spring 60 biases the engagement devices 62 away from body 52 in the normal state so that the threaded portions 70 are engaged with thread valleys 15 and thread peaks 17 and permit only rotational movement for the second rate of relative axial movement while not allowing the first rate of relative axial movement when the spring is expanded.

Figure 6:
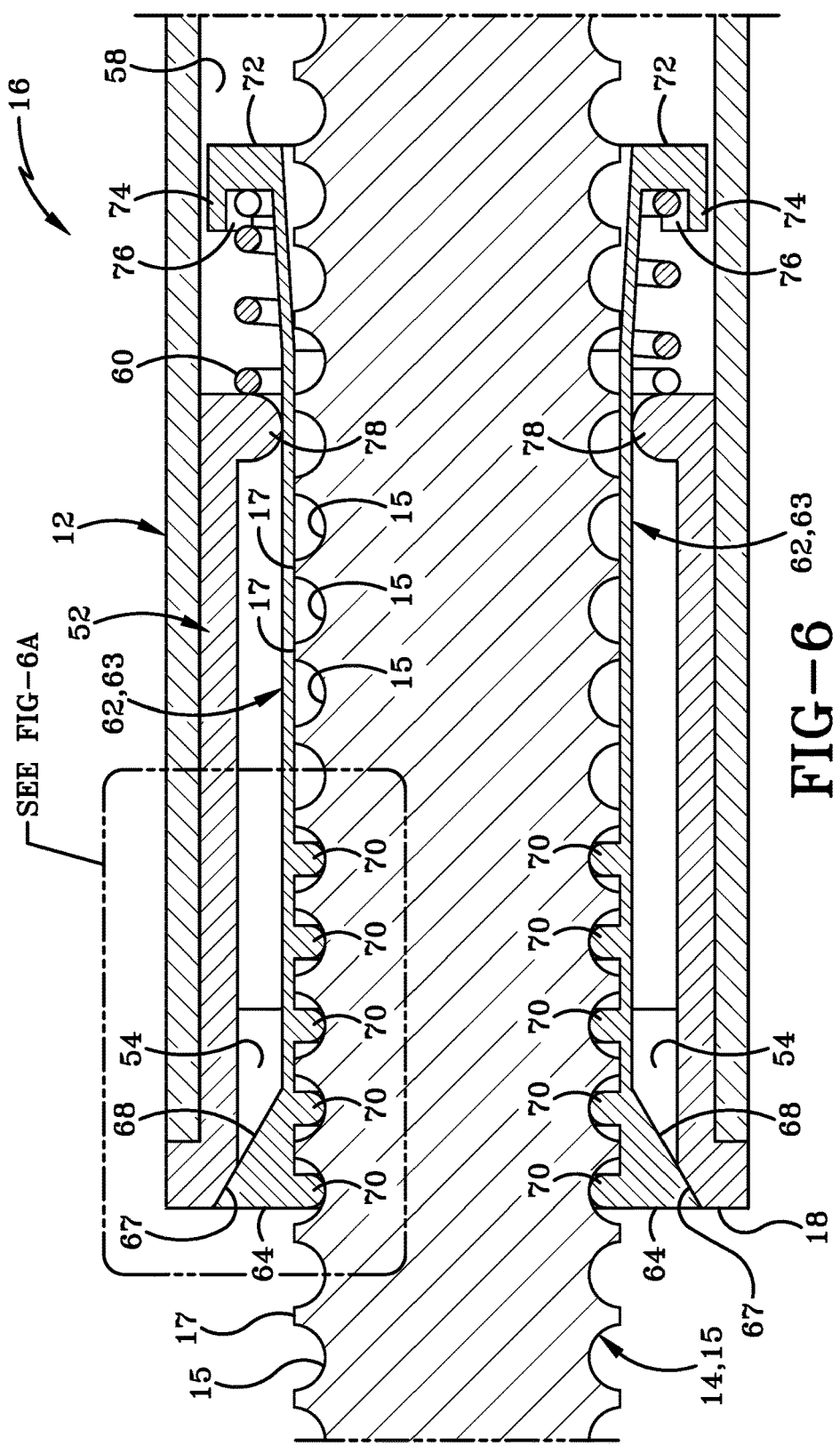
FIG. 6 is a sectional view of the adjustment mechanism taken generally about line 6-6 in FIG. 4.
Figure 6A:
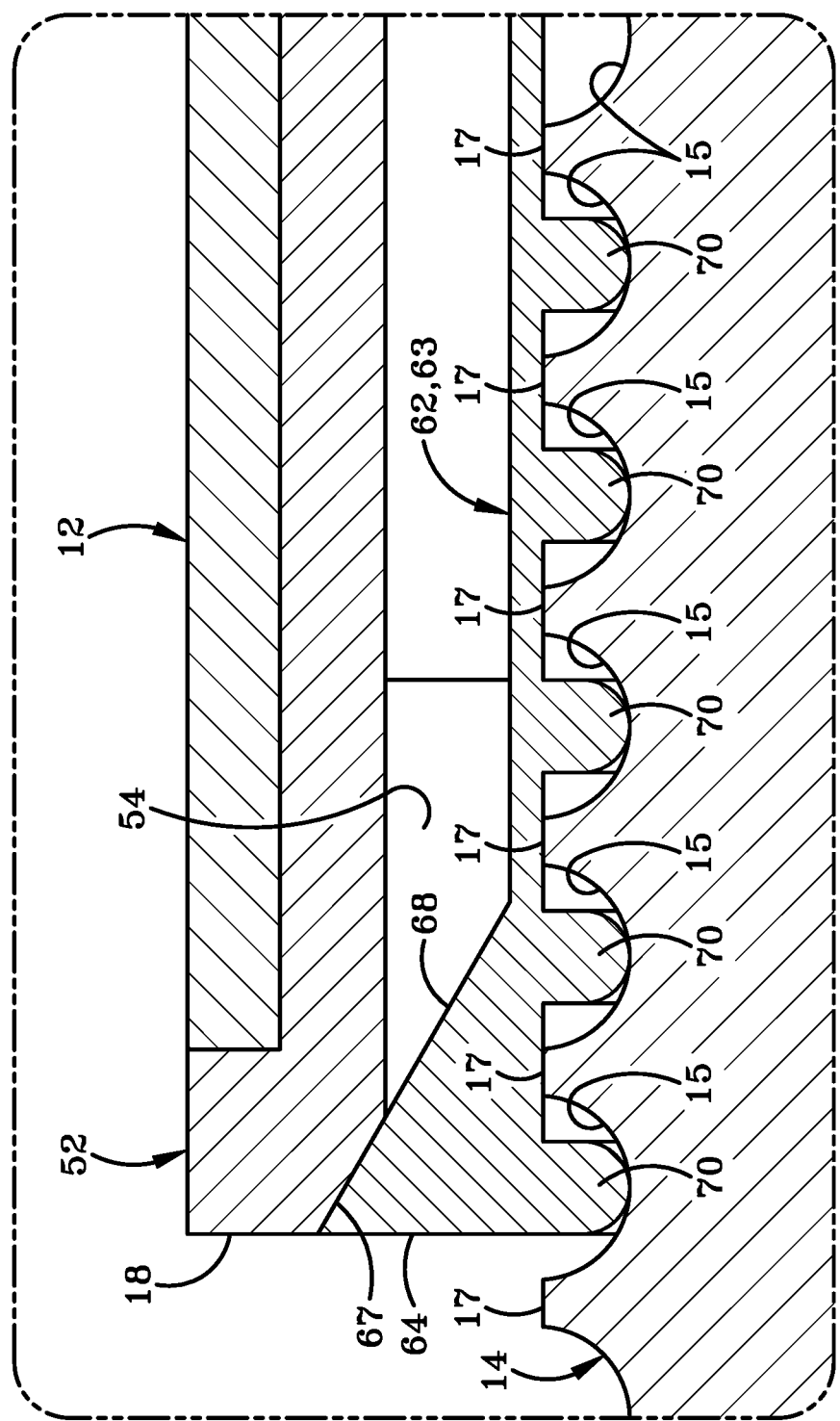
FIG. 6A is an enlarged view of the portion labeled 6A in FIG. 6.

FIG. 6 illustrates the adjustment mechanism 16 with the spring 60 contacting end 78 of body 52 which forces ramped portion 68 into ramps 67 of body 52. The ramped portion 68 engagement with ramps 67 ensures that threaded portions 70 engage with thread valleys 15 or thread peaks 17. Again, in this aspect and manner only rotational movement can permit the slower rate of axial movement between the mounting plates.

Figure 7:
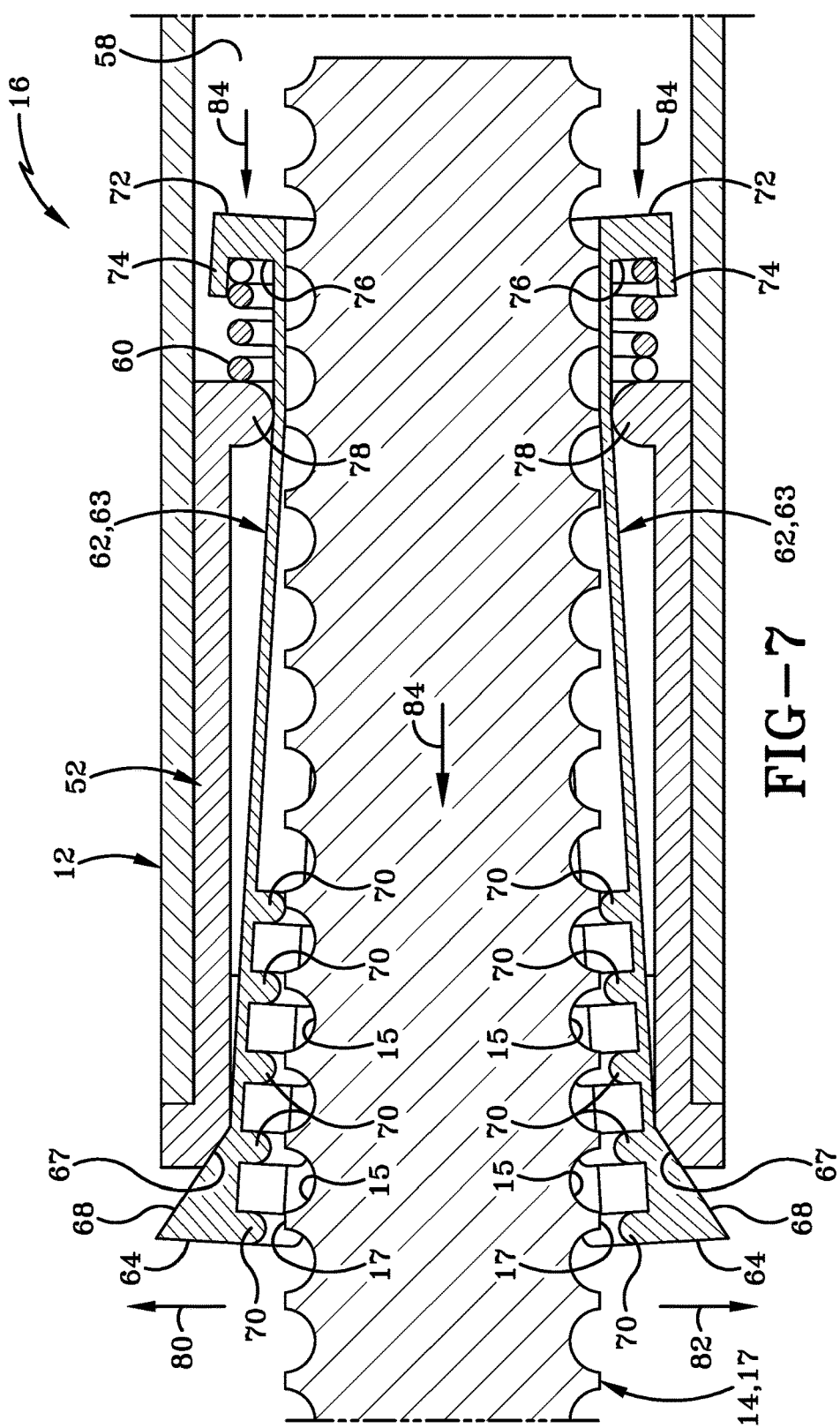
FIG. 7 is a sectional view of the adjustment mechanism.

FIG. 7 illustrates the electrical box brace 10 during a first rate of relative movement with the sleeve 12 and the rod 14 being pulled axially apart from each other in the direction associated with arrow 84. As the rod 14 and sleeve 12 are separated in this direction, spring 60 is compressed and the ramped portion 68 permits the engagement devices 62 to move away from the rod 14 in the directions associated with arrows 80 and 82. Accordingly, rod 14 can be quickly separated from the sleeve 12 and provide fast axial movement and thus coarsely align the mounting plates between the joists in a ceiling or wall. When pressure in the direction of arrows 84 is removed, spring 60 forces the engagement devices 62 back against the ramped portion 68 to re-engage the engagement devices 62 with the rod 14. At this point, the user can rotate the rod 14 or sleeve 12 to provide further relative moment at a slower axial rate due to the rotation, but provide more torque to drive the mounting plates into the joists.

Figure 10:
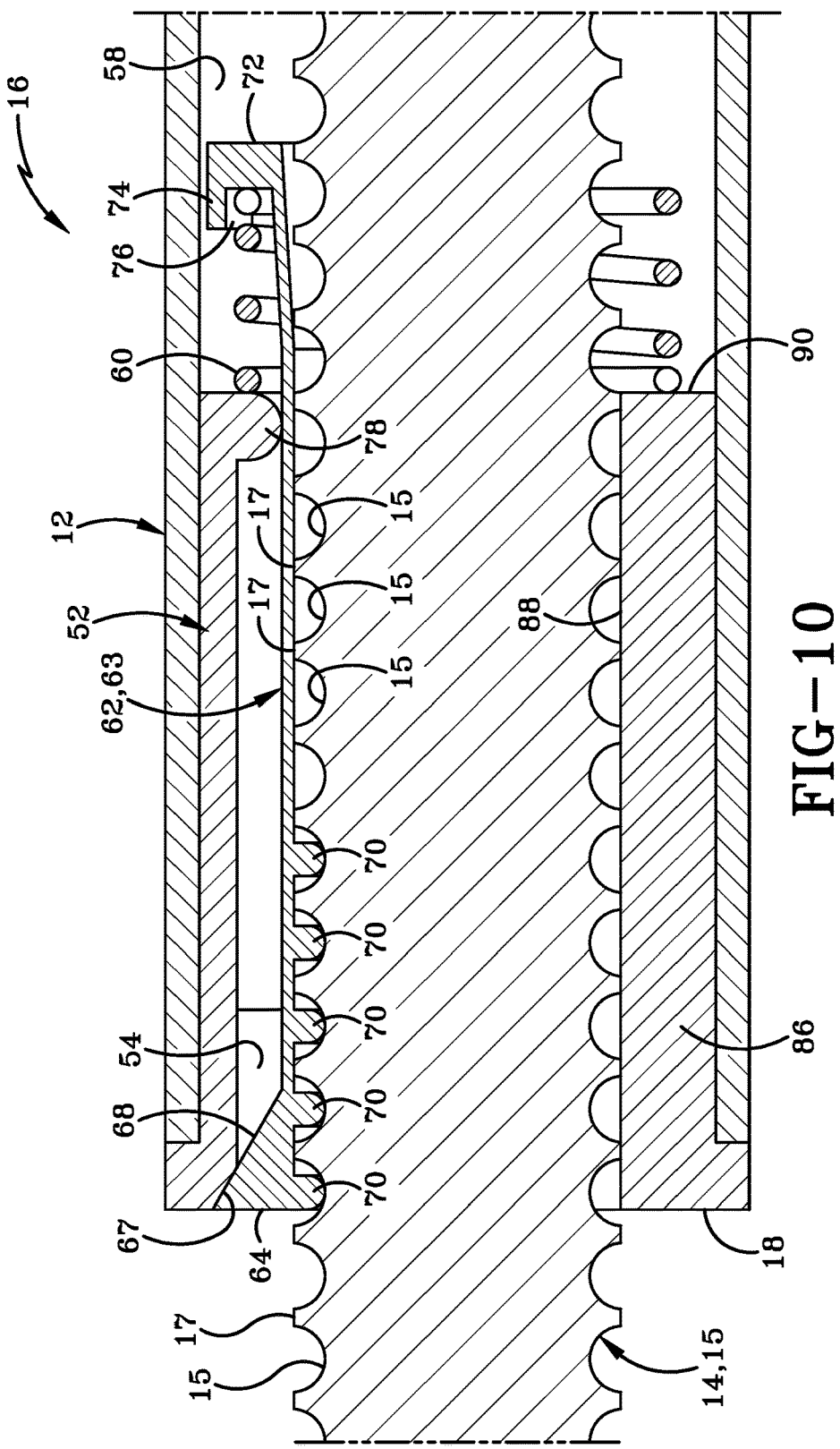
FIG. 10 is a sectional view of the second adjustment mechanism.

FIGS. 8-10 illustrate a second aspect engagement mechanism 16 having only a single engagement device 62 therein. Spring 60 engages tabs 78 on engagement device 62 and a thicker rear wall 90 on a bottom portion 86 of engagement mechanism 16 and particularly body 52. Still further, an interior wall 88 of body 52 permits rod 14 to pass through and engagement with the single engagement device 62 provides the functionality described above but accomplished with only one engagement device instead of two.

Figure 11:
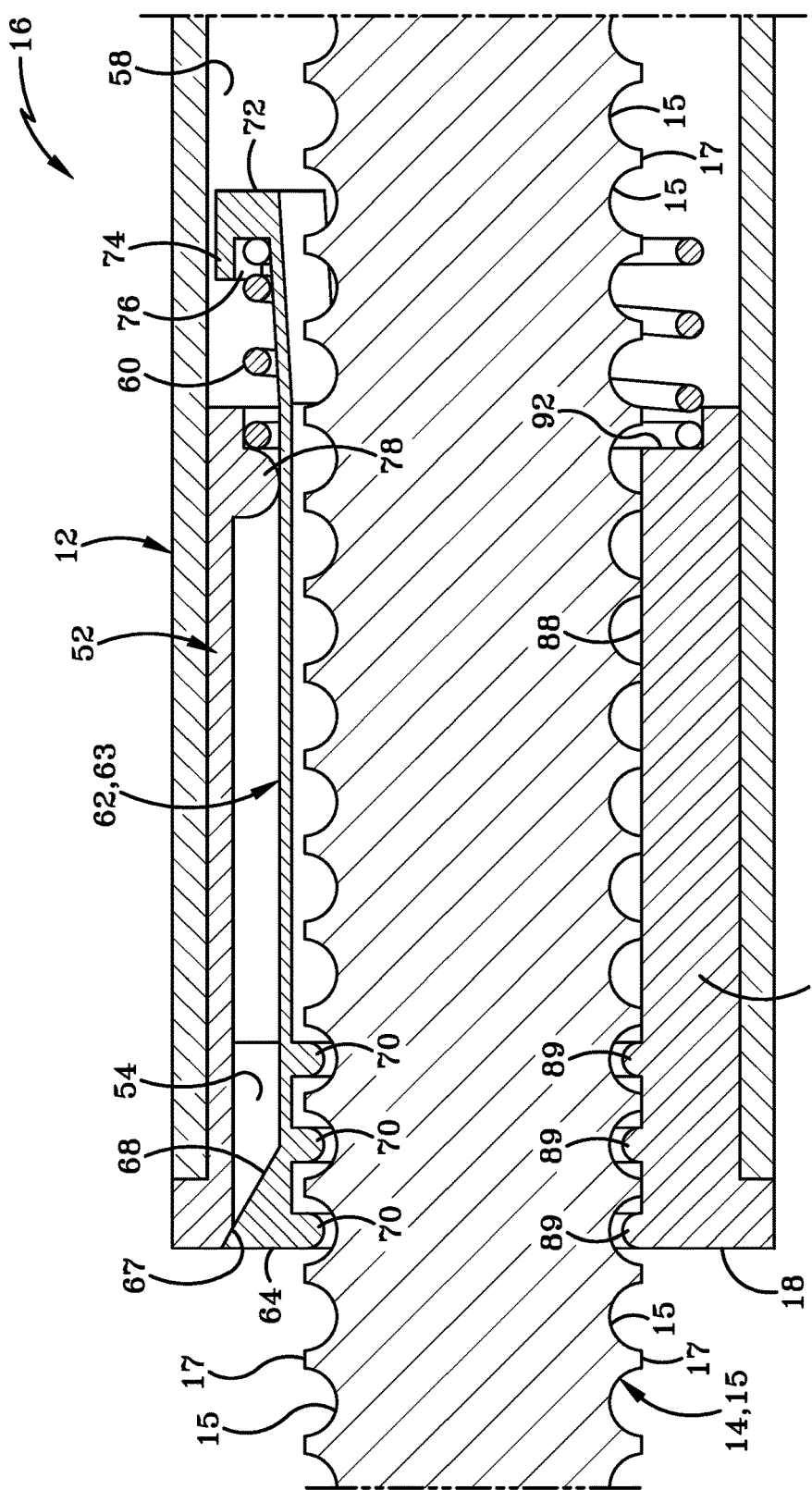
FIG. 11 is a sectional view of a third adjustment mechanism.
Figure 12:
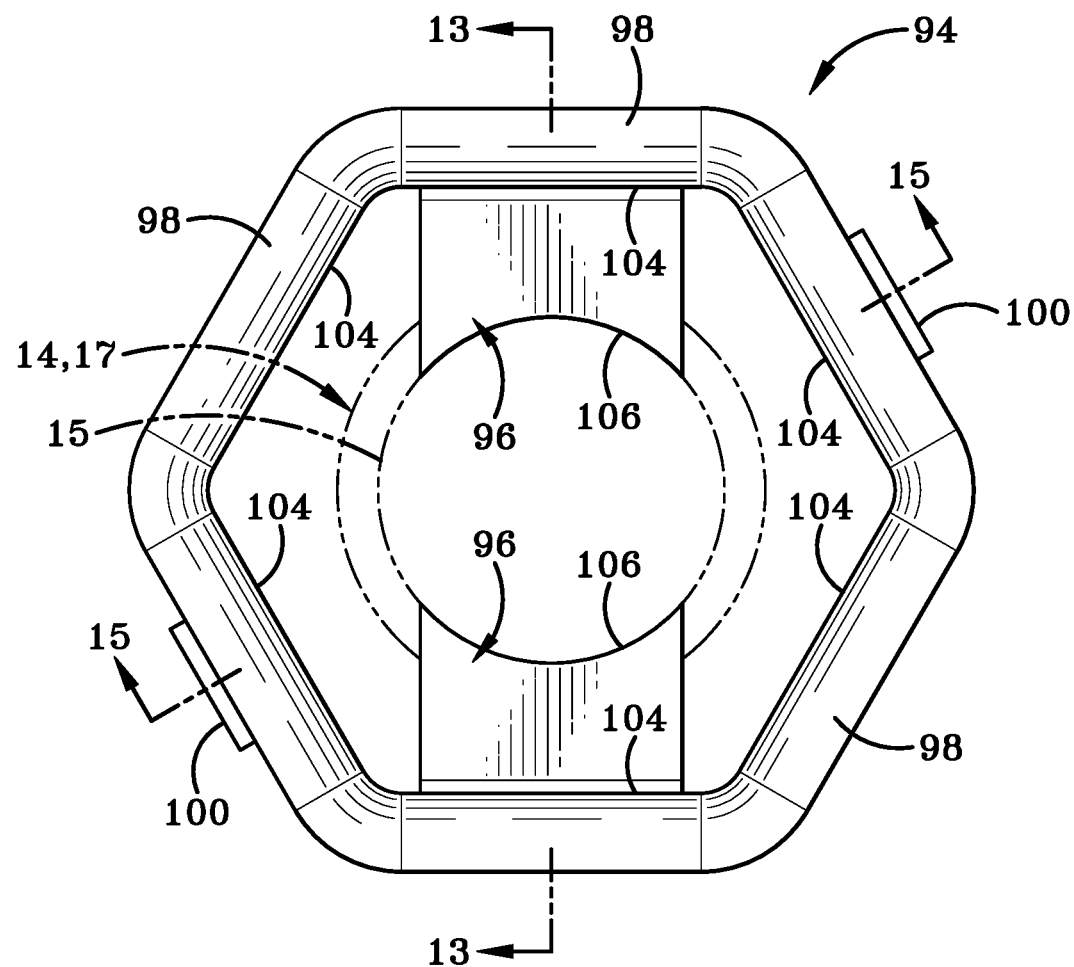
FIG. 12 is a front view of a fourth adjustment mechanism.

FIG. 11 illustrates a third aspect engagement mechanism 16 having the same functionality and features as previously disclosed aspects. Specifically, tab 78 may be recessed within in interior wall 88 from the end and a recess 92 may be positioned opposite tab 78 which is arranged to receive spring 60 therein. In this orientation, spring 60 may be better secured within the engagement member for more consistent operation. Still further, threads 89 may be positioned on bottom portion 86 and interior wall 88. Nevertheless, the operation and functionality remains the same, even with fewer threaded portions on engagement device 62.

FIGS. 12-15 illustrate various views of a fourth aspect engagement mechanism 94 which may be made from a spring steel or other suitable material. Engagement mechanism 94 may include engagement tabs 96 having an end 106 for contacting thread valleys 15. Engagement mechanism 94 may also include curved ends 98 with side walls 104 and bendable joints 102 connecting the side walls 104 and engagement tabs 96. FIG. 13 illustrates the end 106 contacting the rod 14 and which prevents the rod 14 from moving into the engagement mechanism 94. FIG. 14 shows rapid movement due to axial separation of rod 14 and sleeve 12 moving relative to one another. Specifically, rod 14 is moved in the direction associated with arrow 108 which forces ends 106 in the direction associated with arrows 110 due to the angled arrangement of engagement tabs 96. Accordingly, once the axial movement in the direction of arrow 108 stops, ends 106 are repositioned within thread valleys and axial movement in the direction opposite arrow 108 is prevented. Nevertheless, rotational relative movement can occur in either direction which results in axial movement to expand or contract the distance between the two mounting plates once the ends 106 are repositioned within thread valleys. Accordingly, the user can rapidly expand the distance between the mounting plates in a single direction and then reduce the distance between the mounting plates by rotating the rod or sleeve in a first direction and further expand the distance between the mounting plates by rotating the rod or sleeve in a second direction opposite the first direction.

Figure 15:
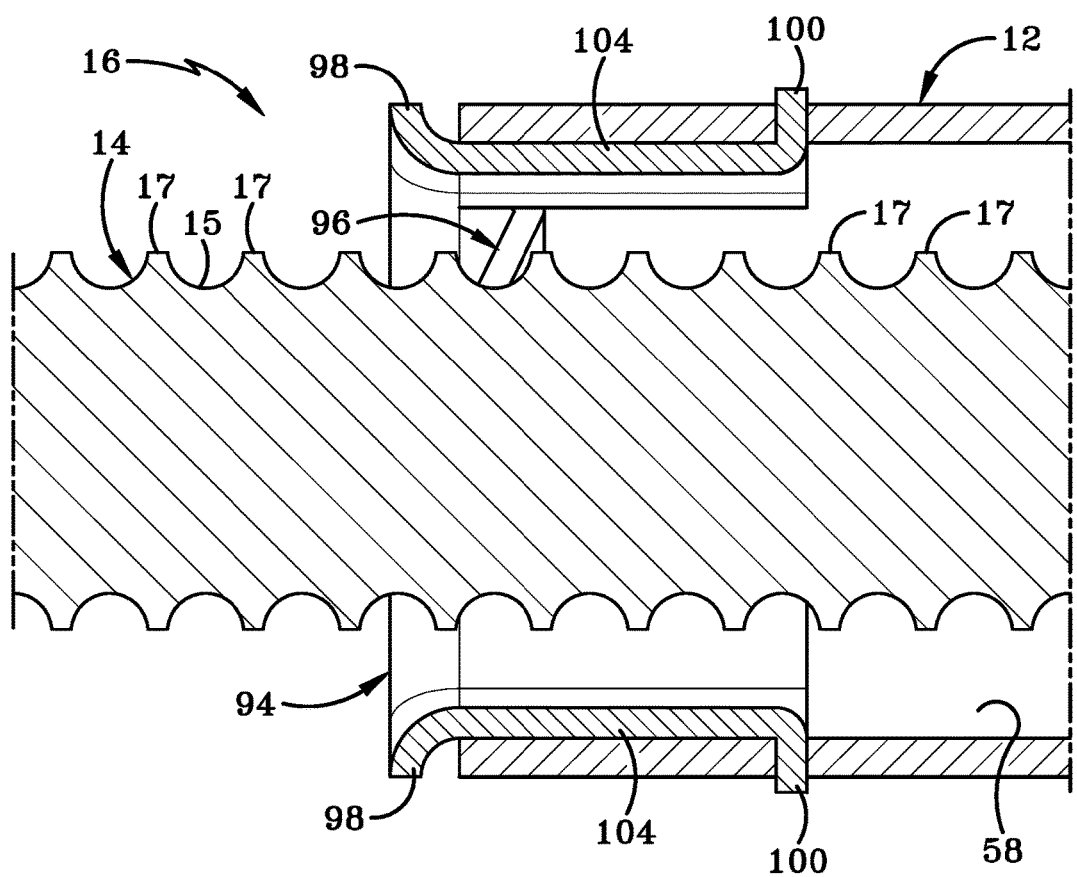
FIG. 15 is a sectional view taken generally about line 15-15 in FIG. 12.

Still further, as seen in FIG. 15, engagement mechanism 94 is secured within sleeve 12 with tabs 100 which may extend through a portion of sleeve 100. As can be seen, the engagement mechanism 94 provides an efficient and reliable way to significantly reduce the installation time of an electrical box brace because coarse and rapid movement is accomplished without impact the ability to provide a high torque fine engagement between the rod and the sleeve.

In operation, the electrical box brace is expanded from a first position to a second position by axially extending or pulling the sleeve and the rod apart from each other at the adjustment mechanism. During this operation, the adjustment mechanism moves from a first closed position due to a spring bias to a second open position where the spring is overcome and the threads are disengaged. Once an approximate distance is reached, the tension on the spring is released and the threads are once again engaged. When the threads are engaged, rotation may occur to further expand the electrical box brace mounting plate distance and provide the ample torque necessary to engage the joists with the mounting plates. Still further, axial movement may be prevented to contract the electrical box brace and may require rotational movement between the rod and the sleeve. In all aspects, an aspect may be to provide at least two speeds to relative movement, wherein one of the rates is significantly faster and easier than the other rates.

It will be understood that implementations are not limited to the specific components disclosed herein, as virtually any components consistent with the intended operation of a method and/or system implementation for an electrical box brace may be utilized. Components may comprise any shape, size, style, type, model, version, class, grade, measurement, concentration, material, weight, quantity, and/or the like consistent with the intended operation of a method and/or system implementation for an electrical box brace.

The concepts disclosed herein are not limited to the specific implementations shown herein. For example, it is specifically contemplated that the components included in a particular implementation of an electrical box brace may be formed of any of many different types of materials or combinations that can readily be formed into shaped objects and that are consistent with the intended operation of an electrical box brace. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the electrical box brace may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an electrical box brace, it should be readily apparent that a number of modifications may be made without departing from the spirit thereof and that these implementations may be applied to other electrical box braces. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

We claim:

1. An electrical box brace comprising:
   a rod;

a sleeve;

at least one mounting plate;

an adjustment mechanism having a body, a spring and connecting the rod and sleeve, and at least one engagement device positioned within the adjustment mechanism body;

wherein the at least one engagement device includes at least one threaded portion opposite a ramp, the at least one threaded portion and the ramp positioned on a first end of the at least one engagement device, the at least one engagement device comprising a second end comprising a retaining region formed between the second end and a closing wall; and, wherein the ramp selectively engages the adjustment mechanism body to permit engagement or disengagement of the at least one threaded portion with the rod.

2. The electrical box brace of claim 1 wherein the at least one engagement device is two engagement devices.

3. The electrical box brace of claim 2 wherein the two engagement devices are position on opposite sides of the rod.

4. The electrical box brace of claim 2 wherein the engagement devices do not contact one another during operation.

5. The electrical box brace of claim 1 wherein an electrical box is secured to the electrical box brace.

6. The electrical box brace of claim 1 wherein an electrical box is removably secured to the electrical box brace.

7. The electrical box brace of claim 1 wherein the at least one mounting plate is a mounting plate rotatably mounted to an end portion on each of the sleeve and the rod.

8. The electrical box brace of claim 1 wherein the spring is positioned within the retaining region.

9. The electrical box brace of claim 1 wherein the adjustment mechanism body further comprises at least one ramp.

10. The electrical box brace of claim 9 wherein the at least one adjustment mechanism body ramp is two ramps positioned opposite each other.

11. The electrical box brace of claim 9 wherein the at least one adjustment mechanism body ramp engages the at least one engagement device ramp.

12. The electrical box brace of claim 1 wherein the threaded portion further comprises five threads.

13. An electrical box brace comprising:

a rod;

a sleeve;

at least one mounting plate;

an adjustment mechanism having a body, a spring and connecting the rod and sleeve, and at least one engagement device positioned within the adjustment mechanism body;

wherein the at least one engagement device includes at least one threaded portion opposite a ramp, the at least one threaded portion and the ramp positioned on a first end of the at least one engagement device, the at least one engagement device comprising a second end comprising a retaining region with the spring positioned within the retaining region; and, wherein the ramp selectively engages the adjustment mechanism body to permit engagement or disengagement of the at least one threaded portion with the rod.

* * * * *